US008650123B2

(12) United States Patent
Summerrow et al.

(10) Patent No.: US 8,650,123 B2
(45) Date of Patent: Feb. 11, 2014

(54) ENTRY LEVEL BANKING PRODUCTS

(75) Inventors: Kimberly Belle Summerrow, Charlotte, NC (US); Faith A. Tucker, Wichita, KS (US); John Franklin Tuders, Harrisburg, NC (US)

(73) Assignee: Bank of America Corporation, Charlotte, NC (US)

( * ) Notice: Subject to any disclaimer, the term of this patent is extended or adjusted under 35 U.S.C. 154(b) by 71 days.

(21) Appl. No.: 13/204,441

(22) Filed: Aug. 5, 2011

(65) Prior Publication Data
US 2012/0284183 A1 Nov. 8, 2012

Related U.S. Application Data

(60) Provisional application No. 61/483,164, filed on May 6, 2011.

(51) Int. Cl.
G06Q 40/00 (2012.01)

(52) U.S. Cl.
USPC ................... 705/42; 705/35; 705/39

(58) Field of Classification Search
USPC ...................................... 705/35–45
See application file for complete search history.

(56) References Cited

U.S. PATENT DOCUMENTS

| | | | |
|---|---|---|---|
| 7,954,708 B2 * | 6/2011 | Blossom | 235/380 |
| 8,181,789 B1 * | 5/2012 | Casella et al. | 206/768 |
| 2005/0125317 A1 * | 6/2005 | Winkelman et al. | 705/30 |
| 2006/0207856 A1 * | 9/2006 | Dean et al. | 194/302 |
| 2006/0273153 A1 * | 12/2006 | Ashby et al. | 235/380 |
| 2007/0038565 A1 * | 2/2007 | Bartz et al. | 705/41 |
| 2010/0268645 A1 * | 10/2010 | Martino et al. | 705/44 |
| 2011/0055081 A1 * | 3/2011 | Vasten | 705/41 |
| 2011/0184823 A1 * | 7/2011 | Phillips | 705/18 |

OTHER PUBLICATIONS

SoCal Credit Card Saturday, May 31, 2008.*
SoCal2 Saturday, May 31, 2008.*
Starbucks Sep. 10, 2009.*
Sheetz Offers GO-Tag Contactless Payment Sticker Jun. 26, 2009.*
Citi Begins Offering Customers Contactless-Payment Stickers PaymentsSource | Thursday, Jun. 10, 2010 By Will Hernandez.*
Citi Launches Contactless Credit Sticker Published: May 26, 2010 NFC Times.*
How Issuers Can Deliver Mobile Payments Today: A Guide for Contactless Sticker Issuance An Issuer White Paper Discover® New Technologies Nov. 2009.*

(Continued)

Primary Examiner — William Rankins
(74) Attorney, Agent, or Firm — Banner & Witcoff, Ltd.; Michael A. Springs

(57) ABSTRACT

Entry level banking products that may be offered through traditional sales channels (e.g., retail banking locations, online, and the like) or alternative sales channels (co-placement or co-branded with a third-party), to new customers who traditionally do not rely on conventional or mainstream checking, savings, and/or credit account products are described herein. Aspects described herein provide predictable, low cost pricing, guardrails on spending, budget controls, and financial education, while offering a low cost solution to serve all markets of banking customers. Aspects may include a reloadable prepaid card, savings account or savings wallet, custom savings plan services, a contactless payment sticker, budget tools, online banking, online bill pay, convenience checks, and low monthly fees. A bundled package may be made available from banking centers (e.g., bank branches) based on a client needs assessment, as well as made available in prepackaged containers sold or distributed at merchants.

15 Claims, 9 Drawing Sheets

(56) References Cited

OTHER PUBLICATIONS

GO-Tag™ Visa® Prepaid Debit Card & Sticker Frequently Asked Questions Last Updated Oct. 5, 2009.*

Home /Questions /Finance/ Credit Cards/ Credit Cards in General by Astrella Hunt on Jun. 9, 2010.*

Starbucks Launches iPhone Apps Sep. 22, 2009 by KC MacLaren.*

\* cited by examiner

MAKE DEPOSITS
• DIRECT DEPOSIT. ASK YOUR EMPLOYER TO AUTOMATICALLY DEPOSIT YOUR PAYCHECK INTO YOUR BANK ACCOUNTS – YOUR ROUTING AND TRANSIT NUMBER WILL BE SENT AFTER ACTIVATION
• DEPOSITING CHECKS OR CASH. VISIT A DEPOSIT-ACCEPTING ATM FOR FREE TO DEPOSIT CASH OR CHECKS
• ADD MONEY AT OVER 40,000 _____ RETAILERS. TO FIND A _____ RETAILER NEAR YOU, VISIT www.bankname.com/bankboxlink
• DEPOSIT FUNDS WITH YOUR SMART PHONE. TAKE A PICTURE OF A CHECK, AND SUBMIT IT THROUGH OUR MOBILE BANKING SERVICE LEARN MORE AND FIND SELF-SERVICE LOCATIONS AT www.bankname.com/bankbox OR FOLLOW US ON SOCIAL MEDIA USE YOUR ACCOUNT
• MAKE PURCHASES WHEREVER CARD IS ACCEPTED, WITH YOUR PREPAID CARD
• LOG IN AT www.bankname.com TO USE FREE ONLINE BILL PAY
• WITHDRAW CASH FREE AT ANY ATM THAT ACCEPTS _____ CARD (FEES MAY APPLY), AND FREE AT OUR ATMs

*IT'S ALL INCLUDED WITH YOUR LOW MONTHLY SERVICE COST OF $X!*

FIG. 5

SAVE MONEY
• LOW SERVICE COST OF JUST $X PER MONTH
• FREE USE OF BANK ATMS
• NO            FEES OR INTEREST CHARGES
• WITH ONLINE BANKING, MOBILE BANKING AND CONVENIENCE CHECKS, THERE IS NO NEED TO PURCHASE MONEY ORDERS TO PAY YOUR BILLS
• SAVINGS WALLET ACCOUNT WITH CUSTOM SAVINGS PLAN FEATURE MAKES IT SIMPLE TO BUILD SAVINGS
TAKE CONTROL
• 24/7 ONLINE ACCOUNT MANAGEMENT – INCLUDING EASY BILL PAY FOR SCHEDULING RENT, UTILITY, AND OTHER PAYMENTS
• ACCOUNT ALERTS TO PROVIDE YOU WITH YOUR BALANCE DAILY
• SECURE, FDIC-INSURED ACCOUNTS PROTECT YOUR MONEY
COMES WITH THE CONVENIENT PREPAID CARD AND A CONTACTLESS STICKER
• MAKE PURCHASES WITH YOUR PREPAID CARD AS YOU WOULD WITH A DEBIT CARD
• GET CASH BACK AT THE RETAIL CHECKOUT
• CAN BE USED IN STORES OR ONLINE – WHEREVER CARD IS ACCEPTED
• ACCESSES ONLY THE MONEY IN YOUR ACCOUNT
EXCLUSIVE FEATURE: CONTACTLESS STICKER CAN BE PLACED ON YOUR PHONE AND USED AT MANY CHECKOUTS INSTEAD OF YOUR CARD
ADD FUNDS ANY TIME
• AT BANK DEPOSIT-ACCEPTING ATMs
• WITH DIRECT DEPOSIT
• VIA SMART PHONE
• AT ANY OF THE 40,000+           RETAILERS

FIG. 6C

WE'VE MADE IT EASY TO MANAGE YOUR MONEY WISELY WITH THE NEW BANKNOW.
IT'S A GREAT CHOICE FOR ANYONE WHO WANTS A LOW-COST, HANDY, SECURE WAY TO MANAGE THEIR MONEY.
WHAT EXACTLY IS BANKBOX?
IT'S A COMPLETE BANKING PACKAGE THAT LETS YOU QUICKLY SET UP ACCOUNTS WHERE YOU CAN PROTECT YOUR CASH, ACCESS IT WHENEVER YOU NEED TO MAKE PURCHASES OR PAY BILLS, AND START TO SAVE FOR THE FUTURE.
WITH BANKBOX, YOU CAN EASILY MANAGE YOUR MONEY ONLINE, AT OUR ATMs, WITH YOUR MOBILE PHONE OR VIA A DIAL-IN CALL CENTER – HOWEVER, IT DOES NOT INCLUDE SERVICE AT OUR BANKING CENTERS.

FIG. 6D

ENTRY LEVEL BANKING PRODUCTS

CROSS-REFERENCE TO RELATED APPLICATIONS

This application claims priority to co-pending provisional application Ser. No. 61/483,164, filed May 6, 2011, and having the title "Entry Level Banking Products," which is herein incorporated by reference in its entirety.

FIELD OF THE INVENTION

The invention relates generally to personal banking systems, methods, and products. More specifically, the invention provides systems and methods for packaging personal banking products suitable for mass market entry level banking customers.

BACKGROUND OF THE INVENTION

As the variety of banking products increases and matures, there remains a gap in banking products for entry-level customers. This product gap is a result of entry level products generally not being as economical for banks than banking products designed for or targeted to customers with more established financial and/or credit profiles. Thus, there is a need for banking products that appeal to entry level customers and that do not result in financial losses to financial institutions.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5 shows a back of a cash card information sheet according to one or more illustrative aspects described herein.

SUMMARY AND DETAILED DESCRIPTION

Figure 1:
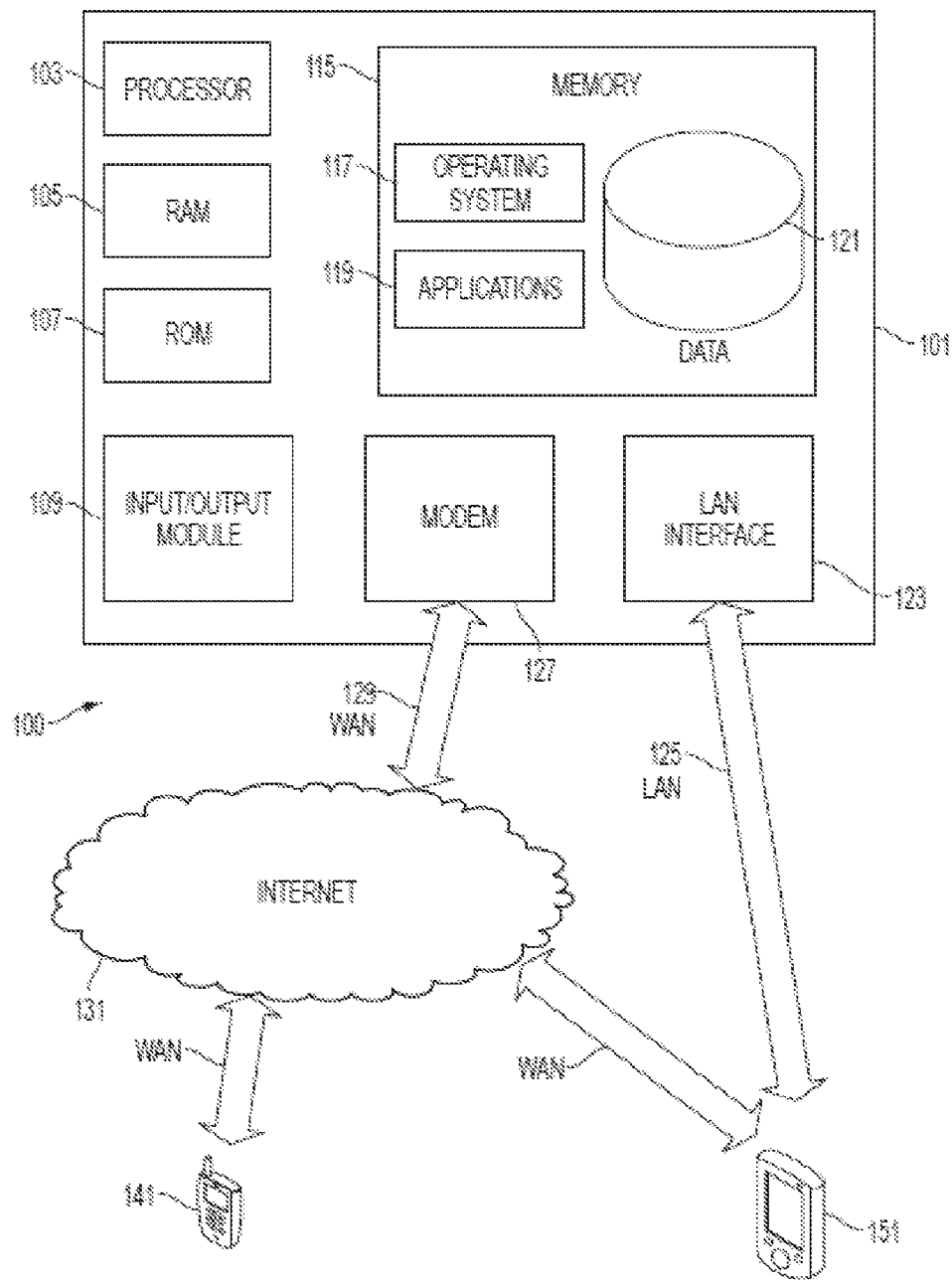
FIG. 1 shows a system architecture that may be used in accordance with one or more illustrative aspects described herein.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof The use of the terms "mounted," "connected," "coupled," "positioned," "engaged" and similar terms, is meant to include both direct and indirect mounting, connecting, coupling, positioning and engaging.

As used throughout this description, the term "financial institution" and "bank" are used interchangeably. Aspects described herein are applicable to any institution or organization that provides access to computer systems and/or networks by remote, mobile, portable or roaming devices. The examples described herein with respect to a bank or financial institution are illustrative in nature only.

Aspects described herein provide one or more entry level banking products that may be offered through traditional sales channels (e.g., retail banking locations, online, and the like) or alternative sales channels (co-placement or co-branded with a third-party), to new customers who traditionally do not rely on conventional or mainstream checking, savings, and/or credit account products. The new entry level product(s) described herein may be offered with an alternative fee schedule, further discussed below, thus making even entry level products profitable for a financial institution. The entry level product(s) may be attractive to first time mass market customers, e.g., college students and young adults; to mass affluent and/or wealth management customers, e.g., to help them educate children or others regarding responsible financial management; to mass market customers that have otherwise been reluctant to open a financial account, e.g., individuals who need or prefer strict money management to avoid a negative financial situation or who are price sensitive; and/or to individuals who are in need of a remedial financial account due to a previous negative financial situation that prevents them from opening a traditional financial account.

The methods and systems described herein, referred to as BankBox, provide predictable, low cost pricing, guardrails on spending, budget controls, and financial education, while designed to be a low cost solution to serve all markets of banking customers. BankBox includes a nonobvious combination of financial products, including a reloadable prepaid card, savings account or savings wallet, custom savings plan (e.g., including but not limited to one that saves the difference between a transaction amount and the next whole dollar amount), a contactless payment sticker, budget tools, online banking, online bill pay, convenience checks, and low monthly fees (e.g., $9/mo, or $4/mo with $1000 recurring deposit, or other fees—fees may be lower than conventional banking accounts with a comparable balance). BankBox may be made available from banking centers (e.g., bank branches) based on a client needs assessment, as well as made available in prepackaged containers sold or distributed at merchants, e.g., on J-hook racks or similar displays. When purchased at a merchant, the purchaser may perform self-fulfillment online, via a call center, mobile device, voice response unit (VRU), or ATM.

Aspects described herein provide customers guardrails on spending, predictable and fair pricing, budget tools, and payment systems to help alleviate misconceptions resulting from lack of knowledge and/or risk aversion, thereby increasing use of banking products by previously underbanked market segments.

FIG. 1 illustrates a block diagram of a computing device 101 (e.g., a computer server, and the like) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by server 101, such as operating system 117, application programs 119, and associated database 121. Alternatively, some or all of server 101 computer executable instructions may be embodied in hardware or firmware (not shown).

Server 101 may operate in a networked environment supporting connections to or by one or more remote, mobile, and/or roaming data processing devices, such as terminals 141 and 151. Devices 141, 151 may be personal computers or servers that include many or all of the elements described above relative to the server 101; devices 101, 141, 151 may also include mobile data processing devices, smartphones, mobile telephones, personal digital assistants, portable computers and the like, which are referring to collectively generically herein as portable access devices (PAD). The network connections depicted in FIG. 1 include a local area network (LAN) 125 and a wide area network (WAN) 129, but may also include other wired or wireless networks, and the like, to provide a comprehensive network for a financial institution. Such a network may be referred to as a financial services network. When used in a LAN networking environment, the computer 101 may be connected to LAN 125 through a network interface or adapter 123. When used in a WAN networking environment, the server 101 may include a modem 127 or other wired or wireless network interface for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like, that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
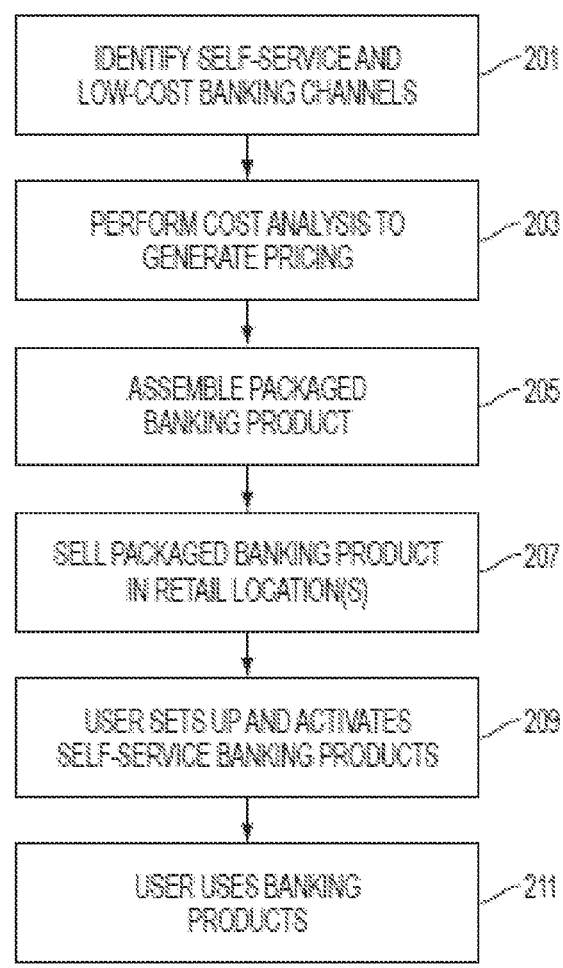
FIG. 2 shows a flowchart of a method according to one or more illustrative aspects described herein.

FIG. 2 illustrates a method of generating a banking product according to one or more illustrative aspects of the invention. In step 201, self-service and low-cost banking channels are identified. In step 203, a banking provider performs cost analysis to determine fair, predictable pricing for a combination of the self-service and low-cost banking channels. The pricing may be set forth in a Schedule of Fees provided to each customer. Step 203 may include offering multiple price points for the combination product, e.g., a first fee per month with no minimum deposit, or a second lower fee per month with a minimum deposit level (or direct deposit). A third fee per month (e.g., free) may also be offered with yet an even higher minimum deposit level (or direct deposit). Fees may vary depending on whether a demand deposit account (DDA) is included, or if a prepaid account is used without a DDA account.

Figures 6A, 6B:
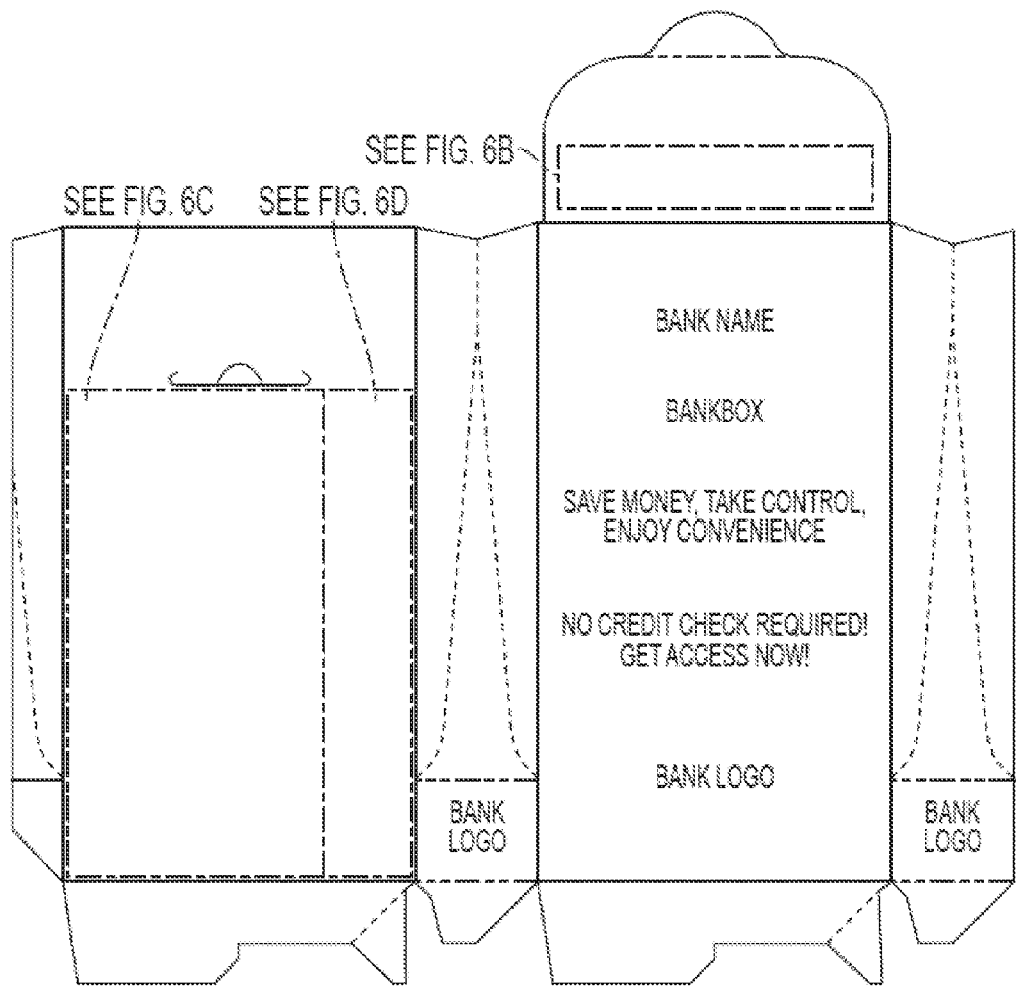
FIG. 6 shows a retail box display template according to one or more illustrative aspects described herein.

In step 205 the financial institution generates a packaged product (see, e.g., FIG. 6) that includes everything an underbanked customer may need to open an account with the financial institution and understand the combination of self-service and low-cost banking products. The package is then placed in retail locations for consumer review and purchase.

Figure 3:
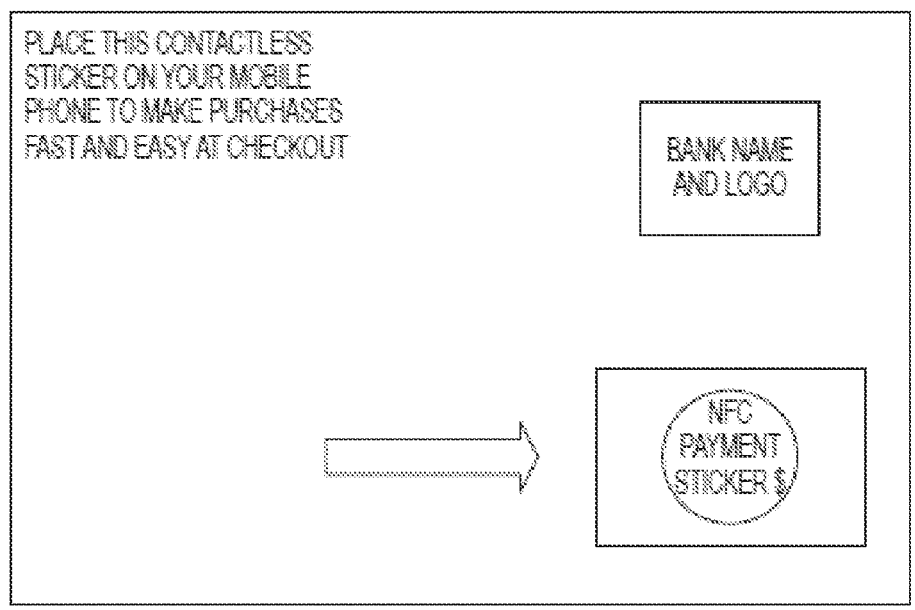
FIG. 3 shows a front of a contactless sticker card according to one or more illustrative aspects described herein.

The package may include a contactless payment sticker or tag (e.g., as shown in FIG. 3). The contactless payment sticker may include a RF chip or other near-field communication (NFC) technology that, when placed near a NFC reader, allows for payment during a transaction. The sticker or tag may be suitable for placement on or attachment to a customer's mobile phone, keychain, and the like.

Figure 4:
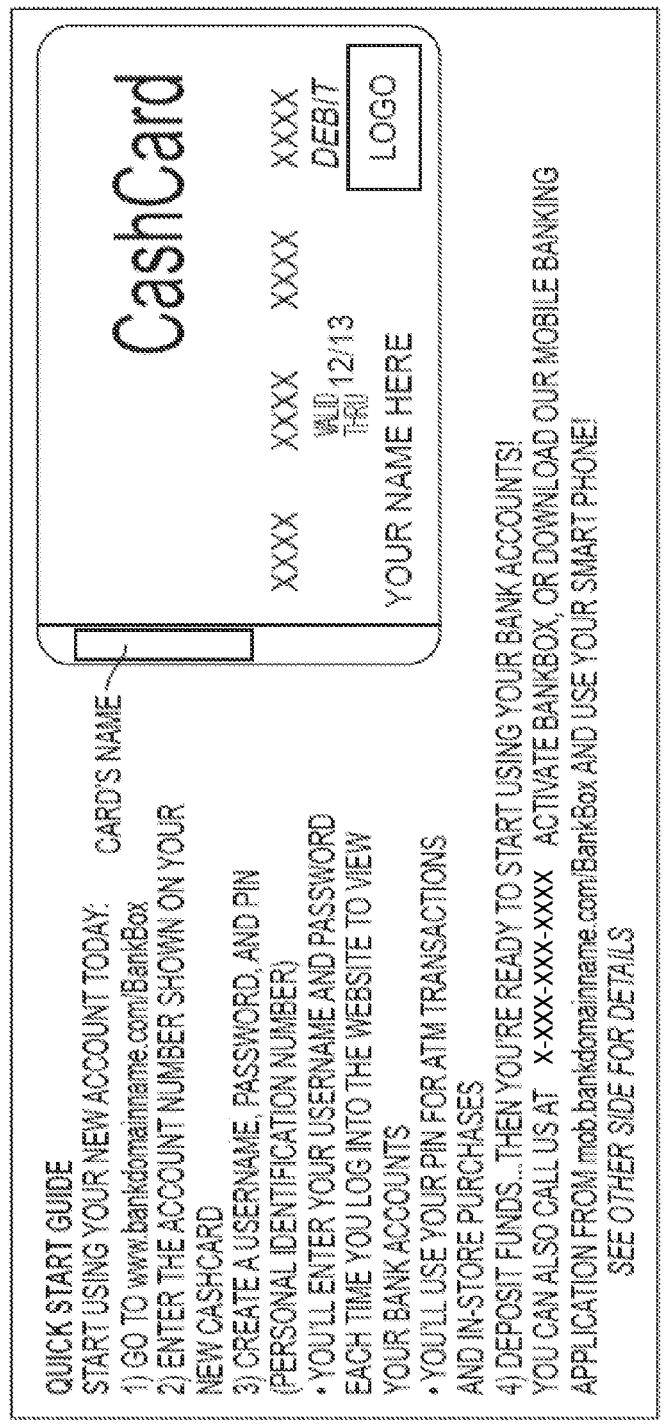
FIG. 4 shows a front of a cash card information sheet, with cash card attached, according to one or more illustrative aspects described herein.

The package may also include a reloadable prepaid card, such as that shown in FIG. 4. The prepaid card may be attached to an informational card, the front and back of which may be similar to that shown in FIG. 4 and FIG. 5, respectively. The prepaid card may be managed by the same financial institution offering the BankBox product, or may be managed by another company, e.g., credit card companies, and the like. By providing a prepaid card, a user can never exceed the balance of his or her account, because any transaction that would exceed the amount of funds remaining will be denied. According to one alternative, a user may establish a virtual savings account, referred to as a "savings wallet", by designating a portion of the available funds on the prepaid card to be "reserved" or held until released by the user. For example, if a user deposits $1000 on his prepaid card, but wants to make sure that $500 is available in 3 weeks to pay his rent, the user may place a hold on $500 of the amount deposited. When the user is ready to pay his rent, he releases the hold, and then can pay his rent using the prepaid card. Alternatively, the user may designate funds for one or more sub-accounts in order to budget money for different things. According to an alternative aspect, the card may be a debit card, charge card, or credit card.

Figure 7:
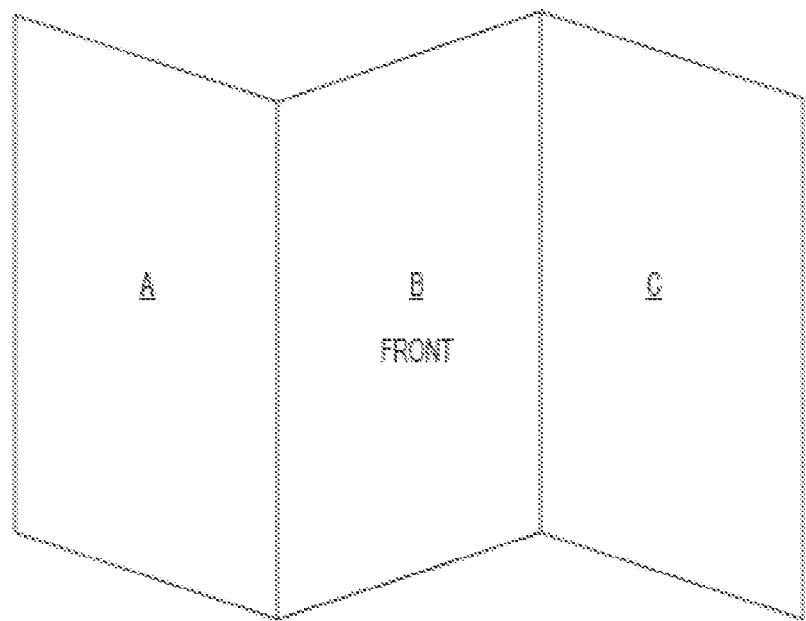
FIG. 7 shows a front of an information pamphlet according to one or more illustrative aspects described herein.
Figure 8:
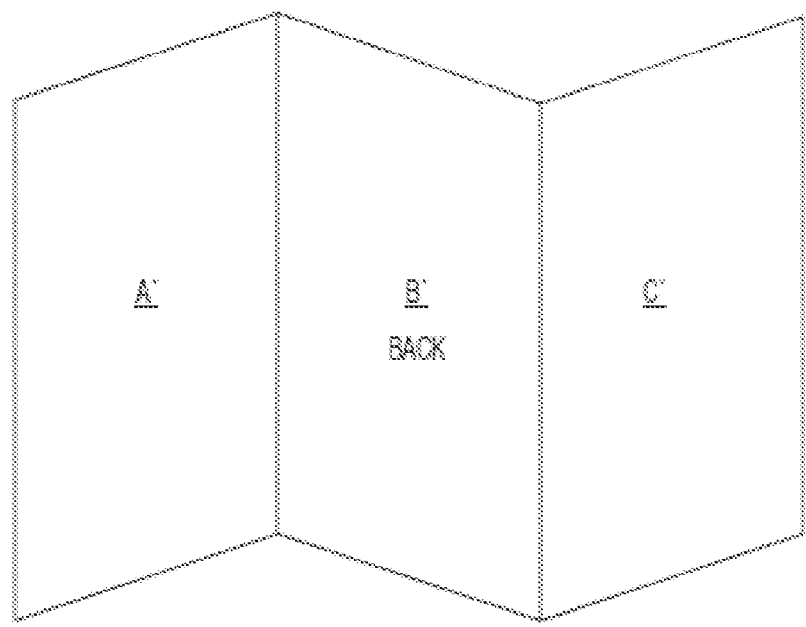
FIG. 8 shows a back of an information pamphlet according to one or more illustrative aspects described herein.

The package may also include an informational pamphlet such as that shown in FIG. 7 and FIG. 8. Handout 901 may be tri-folded, thus providing sections 901A, 901B, and 901C on a front side, and 901A', 901B', and 901C' on a back side of handout 901.

Text for content area 901C may include a bank name and/or logo, a product title (e.g., BankBox), and an advertising tagline.

Text for content area 901B may include supplemental information, e.g., to the effect of: "Questions? BankName is here to help. If you have questions about your new bank accounts or the features included with your BankBox, give us a call at 1-800-XXX-XXXX, visit www.<bankdomainname>.com/BankBox or follow us via social media."

Text for content area 901A may include pictures, a bank name, bank logo, and introductory information, e.g., to instruct a user how to activate and complete enrollment in the suite of banking products described herein, making deposits, withdrawing money, and use of the products to make purchases. Reference information may also be provided, e.g., phone numbers, web site URLs, and the like.

Text for content area 901A' may include images, logos, and/or first information content, e.g., to educate customers regarding the benefits of the BankBox suite of products, inform customers regarding the various tools and products included within the BankBox suite of products, and provide information about how users can effectively utilize the suite of banking products.

Text for content area 901B' may include images (e.g., an image of a CashCard), logos, and/or second information content, e.g., to educate consumers regarding sound financial practices using the suite of banking products, tools that promote fiscal responsibility, bill payment options, and educating customers regarding the benefits that the suite of banking products can provide with respect to financial planning.

Text for content area 901C' may include images, logos, and/or third information content, e.g., to inform customers regarding custom savings tools included within the suite of banking products and intelligent wallet tools included with the suite of banking products.

The package may be boxed in a container similar to that shown in FIG. 7 which, when folded accordingly, presents a variety of information to the customer on the exterior of the container.

Referring back to FIG. 2, in step 207 the customer may purchase a BankBox container, e.g., from a retail merchant or at a bank branch. After purchasing the container, e.g., for a nominal account establishment fee, the customer may open the container to reveal the contents and begin using the BankBox products included therein. Alternatively, the purchase price may be refunded to the customer in the form of an initial deposit in the account when the customer completes the account creation process, or after the account has been opened and used, or as an anniversary refund after the account has remained active for a predetermined amount of time (e.g., one month, three months, one year, and the like.).

In step 209 the user logs in to a predetermined website, calls a specified telephone number, or visits a local bank branch to set up and activate the banking products included within the packaged product. For example, the customer may make an initial deposit to fund one or more accounts, may provide personal information associated with the account, activate the payment card, associate the contactless payment sticker/tag with the user and/or account, and the like. Once activated, the user can begin using the banking products in step 211.

In order to control costs, the prepackaged banking products described herein may be associated with various cost-saving features, e.g., by limiting the ability to conduct transactions with the financial institution only through an ATM or other automated service channel. The customer may be able to reload a card at a bank branch, or may be required to make deposits via ATM. A schedule of fees may further be used to control costs and ensure that the prepackaged product is provided without taking a loss by the financial institution.

Figure 9:
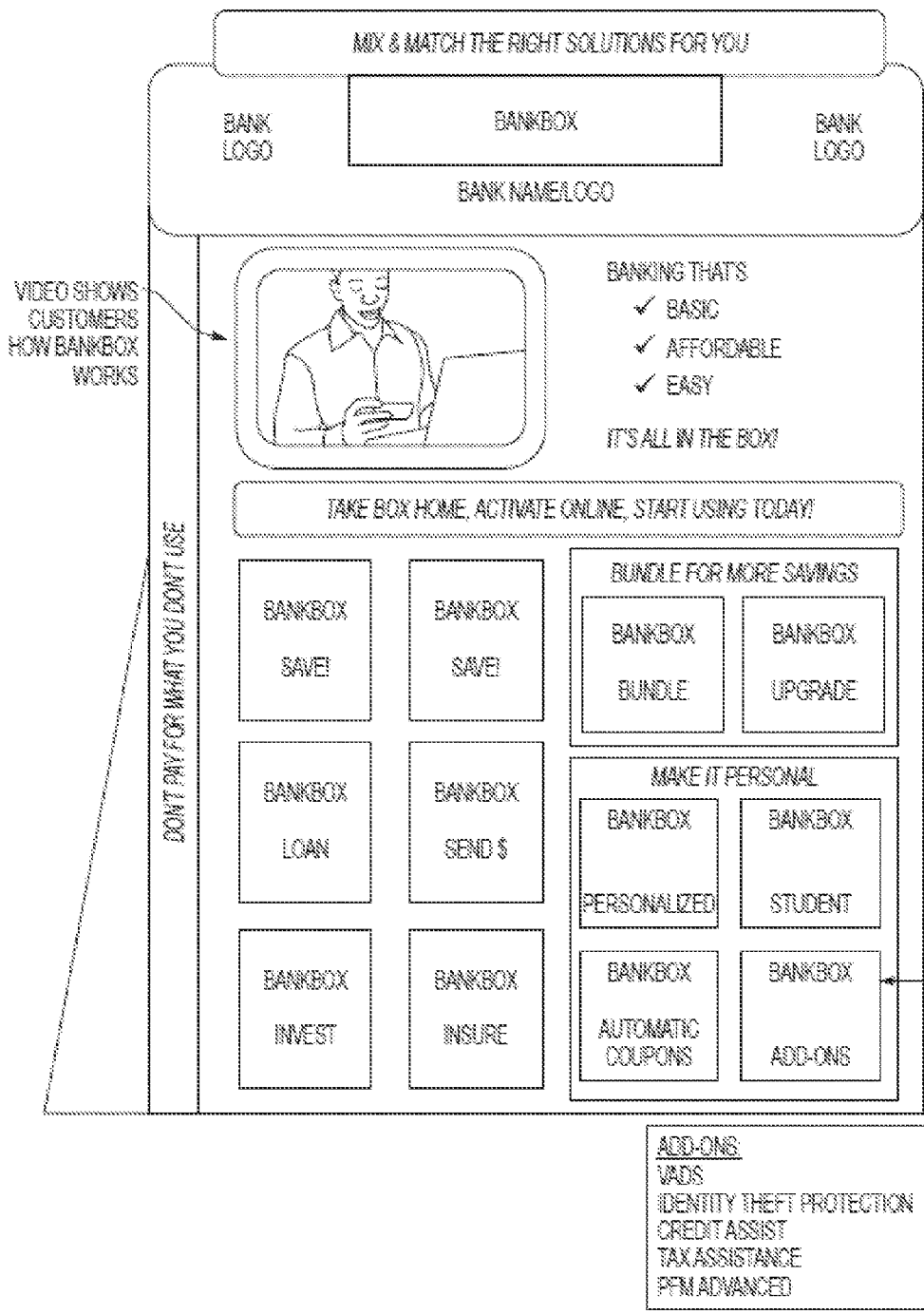
FIG. 9 shows a retail display unit according to one or more illustrative aspects described herein.

FIG. 9 illustrates a store display that may be used to promote and advertise the prepackaged solution described herein. In FIG. 9, the "PAY" solution may correspond to the prepackaged BankBox product described with respect to FIGS. 3-8. Other prepackaged products may also be included on the display, e.g., other products for savings ("SAVE"), lending ("LOAN"), sending money ("SEND"), investing money ("INVEST"), and insurance ("INSURE"). In addition, bundles of items may be placed together along with cost savings to a customer who chooses a bundle instead of a single item. As shown in FIG. 10, a customer may personalize one or more of the prepackaged products using an affinity version of a product or selecting a student version of a product, using coupons, or other add-ons (e.g., identity theft, credit assist, tax assistance, custom savings plan products, and the like).

Retail displays similar to those shown in FIG. 9 may be placed in banking centers, community outreach locations (e.g., churches, community centers), retail locations (e.g., big box stores, drug stores, grocery stores, malls, airport vending machines), or schools (e.g., college book stores, trade schools, high school graduations), to name a few. Other distribution channels may also be used. Depending on the products offered, distribution channels such as car dealerships, tax preparers, office supply companies, shipping retailers, and the like, may also be used. In such a manner one or more of the entry-level products described herein may be seen and purchased by new customers that otherwise have not established a financial account of their own. These new customers can use products, e.g., using the reloadable prepaid card, savings account, custom savings plan service, contactless payment sticker/tag, budget tools, online banking (including email and SMS/text alerts), online bill pay, convenience checks, and financial education information to establish sound financial practices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   providing for purchase a prepackaged product comprising:
      a reloadable prepaid cash card usable to purchase goods via a national charge or credit card network, said reloadable prepaid cash card removably affixed to a first informational sheet, said first informational sheet providing instructions regarding use of the prepaid cash card;
      a contactless payment tag removably affixed to a second informational sheet, said second informational sheet providing instructions regarding use of the contactless payment tag;
      a third informational sheet providing instructions for activating an account associated with the product; and
      an external housing forming an internal compartment housing said reloadable prepaid cash card, contactless payment tag, first informational sheet, second informational sheet, and third informational sheet;
   distributing the prepackaged product to the public;

receiving, by a computing device at a financial institution, account information from a first consumer establishing the account associated with an instance of the prepackaged product;
activating, by the computing device, the account for use by the first consumer;
receiving first input from the first consumer to reserve a user-specified amount of funds in the account; and
prior to receiving second input from the first consumer to release the reserved funds, denying all transaction requests that require use of the reserved fund.

2. The method of claim 1, further comprising:
receiving transaction information based on the first consumer making a payment using the contactless payment tag; and
adjusting an account balance of the account based on the received transaction information.

3. The method of claim 1, wherein said contactless payment tag, when removed from said second informational sheet, is attachable to a mobile communications device using an adhesive present on the contactless payment tag when removed from the second information sheet.

4. The method of claim 1, wherein said contactless payment tag comprises an opening through which the contactless payment tag is attachable to a keychain.

5. The method of claim 1, further comprising:
receiving the second input to release the reserved fund; and
subsequent to receiving the second input, authorizing a transaction that requests a payment using the reserved funds.

6. The method of claim 5, wherein the transaction is based on the prepaid cash card.

7. The method of claim 5, wherein the transaction is based on the contactless payment tag.

8. The method of claim 1, further comprising:
receiving funds from the user to add to the prepaid cash card; and
adjusting a balance of the prepaid cash card based on the received funds.

9. The method of claim 1, wherein the prepaid cash card draws from the account.

10. The method of claim 1, wherein the prepaid cash card draws from a second account, different from the account associated with the product.

11. One or more non-transitory computer readable media storing computer executable instructions that, when executed, cause an apparatus to provide account management services by:
receiving first input from a first consumer to establish an account associated with a prepackaged retail product obtained by the customer, said prepackaged retail product comprising:
a reloadable prepaid cash card usable to purchase goods via a national charge or credit card network, said reloadable prepaid cash card removably affixed to a first informational sheet, said first informational sheet providing instructions regarding use of the prepaid cash card,
a contactless payment tag removably affixed to a second informational sheet, said second informational sheet providing instructions regarding use of the contactless payment tag,
a third informational sheet providing instructions for activating the account associated with the prepackaged retail product, and
an external housing forming an internal compartment housing said reloadable prepaid cash card, contactless payment tag, first informational sheet, second informational sheet, and third informational sheet;
activating the account for use by the first consumer when the first consumer initiates a transaction using at least one of the contactless payment tag and the prepaid cash card;
receiving second input from the first consumer to reserve a user-specified amount of funds in the account; and
prior to receiving third input from the first consumer to release the reserved funds, denying all transaction requests that require use of the reserved fund.

12. The computer readable media of claim 11, wherein the account management services are further provided by:
receiving the third input to release the reserved fund; and
subsequent to receiving the third input, authorizing a transaction that requests a payment using the reserved funds.

13. The computer readable media of claim 12, wherein the transaction is based on the prepaid cash card.

14. The computer readable media of claim 12, wherein the transaction is based on the contactless payment tag.

15. The computer readable media of claim 12, wherein the account management services are further provided by:
receiving funds from the user to add to the prepaid cash card; and
adjusting a balance of the prepaid cash card based on the received funds.

* * * * *